(12) United States Patent
Heylen et al.

(10) Patent No.: US 7,661,145 B2
(45) Date of Patent: Feb. 9, 2010

(54) METHOD AND APPARATUS FOR COPY PROTECTION FOR APPLICATIONS

(75) Inventors: Richard A. A. Heylen, Leeds (GB); Mark Dominic Jackson, Chineham (GB)

(73) Assignee: Macrovision Europe Limited (GB)

( * ) Notice: Subject to any disclaimer, the term of this patent is extended or adjusted under 35 U.S.C. 154(b) by 854 days.

(21) Appl. No.: 10/504,812

(22) PCT Filed: Feb. 19, 2004

(86) PCT No.: PCT/GB2004/000647

§ 371 (c)(1), (2), (4) Date: Aug. 13, 2004

(87) PCT Pub. No.: WO2004/075186

PCT Pub. Date: Sep. 2, 2004

(65) Prior Publication Data

US 2005/0163315 A1    Jul. 28, 2005

Related U.S. Application Data

(63) Continuation-in-part of application No. 09/916,146, filed on Jul. 26, 2001.

(30) Foreign Application Priority Data

Feb. 21, 2003    (GB) ................... 0304015.1

(51) Int. Cl.
  G06F 11/00    (2006.01)
  G06F 12/14    (2006.01)
(52) U.S. Cl. .................. 726/27; 380/203; 713/193
(58) Field of Classification Search .......... 380/203; 713/193; 726/27
  See application file for complete search history.

(56) References Cited

U.S. PATENT DOCUMENTS 4,603,413 A    7/1986    Sinjou et al.

(Continued)

FOREIGN PATENT DOCUMENTS

EP    0918326    5/1999

(Continued)

OTHER PUBLICATIONS

Kalker, T., "System Issues in Digital Image and video Watermarking for Copy Protection", Multimedia Computing and Systems 1999, IEEE International Conference in Florence, Italy on Jun. 7-11, 1999, Los Alamitos, CA, USA IEEE Comput.Soc., US Jun. 7, 1999, pp. 562-567.

(Continued)

*Primary Examiner*—Michael Pyzocha
(74) *Attorney, Agent, or Firm*—Norman R. Klivans (57) ABSTRACT

A copy protection technique is described which enables the content (14) of an application file (4, 20), for example, provided by a licensed game provider, to be copy protected without action having to be taken at the time of encoding the application file onto a DVD or other optical disc. DSV data patterns, that is data patterns which are difficult to encode without causing DSV problems, are to be incorporated in the application file (4, 20). It is expected that sophisticated encoders (8) at games console manufacturers will be able, for example, by using look-ahead techniques, to encode and apply the application to the glass master (10) in a manner such that the encoded data will not cause DSV problems. However, if an attempt is made to read the data on the original disc, for example, for copying purposes, the DSV data patterns will cause a CD or DVD writer to encode the data onto the copy disc in a manner which renders the resultant copy disc effectively unplayable. The DSV data patterns may be incorporated in an application file (20) within information, or in control data therof (FIG. 5).

12 Claims, 4 Drawing Sheets

U.S. PATENT DOCUMENTS

| | | | |
|---|---|---|---|
| 4,885,750 A * | 12/1989 | Tanaka et al. | 714/755 |
| 5,659,613 A | 8/1997 | Copeland et al. | |
| 5,699,434 A * | 12/1997 | Hogan | 705/57 |
| 5,703,858 A | 12/1997 | Mitchell et al. | |
| 5,748,119 A | 5/1998 | Ko | |
| 5,787,068 A | 7/1998 | Arps et al. | |
| 5,828,754 A | 10/1998 | Hogan | |
| 5,832,088 A | 11/1998 | Nakajima et al. | |
| 6,028,936 A | 2/2000 | Nillis | |
| 6,278,386 B1 | 8/2001 | Hogan | |
| 6,317,397 B1 | 11/2001 | Deguchi et al. | |
| 6,353,890 B1 | 3/2002 | Newman | |
| 6,421,750 B1 | 7/2002 | Gunther et al. | |
| 6,694,023 B1 | 2/2004 | Kim | |
| 6,782,190 B1 | 8/2004 | Morito | |
| 6,839,312 B2 | 1/2005 | Heylen | |
| 7,030,788 B2 | 4/2006 | Aida et al. | |
| 7,098,820 B2 * | 8/2006 | Saito et al. | 341/59 |
| 2001/0011237 A1 | 8/2001 | Tanaka et al. | |
| 2002/0076046 A1 | 6/2002 | Heylen | |
| 2003/0002866 A1 * | 1/2003 | Owa et al. | 386/126 |

FOREIGN PATENT DOCUMENTS

| | | |
|---|---|---|
| EP | 1011103 A1 | 6/2000 |
| EP | 1355306 A1 | 10/2003 |
| EP | 1418584 A1 | 5/2004 |
| EP | 1505598 A1 | 2/2005 |
| EP | 1521262 A1 | 4/2005 |
| GB | 2397687 A | 7/2004 |
| WO | WO 98/02885 | 1/1998 |
| WO | WO 98/57413 | 12/1998 |
| WO | WO 00/74053 | 12/2000 |

OTHER PUBLICATIONS

Schouhamer Immink, K.A., "EFMPlus: The Coding Format of the Multimedia Compact Disc", IEEE Transactions on Consumer Electronics, IEEE Inc., New York, US, vol. 41, No. 3, Aug. 1, 1995, pp. 491-497.

EP Search Report dated Feb. 25, 2005 for EP 05 00 0302, 2 pages.

Menezes, Alfred J., et al., Handbook of Applied Cryptography, 1997, CRC Press LLC, pp. 20-23.

* cited by examiner

Pits and lands

Corresponding DSV

METHOD AND APPARATUS FOR COPY PROTECTION FOR APPLICATIONS

The present invention relates to an application file to be carried on an optical disc and to a method of copy protecting an application, where the application is provided by an application file to be carried on an optical disc. The invention also extends to a copy protected optical disc carrying an application and to a storage device for use in a process of mastering optical discs.

Optical discs, such as the various formats of compact discs (CDs) and of digital versatile discs (DVDs) are increasingly used for carrying information for many different applications. The information encoded onto the optical discs is generally very valuable, and accordingly, they are increasingly copied by counterfeiters. Furthermore, recordable CDs, and CD writers for writing the information content from one disc to such recordable discs, are now readily available to the domestic consumer. Recordable DVDs and DVD writers are expected to become as readily available in the short term. This means that new and effective methods for copy protecting optical discs are required.

Many techniques now exist for copy protecting the information on optical discs but these usually require the application of copy protection data to the optical disc during the mastering process. However, there are situations where access to the mastering process is not appropriate or is not available. For example, the licensed providers of games for games consoles such as XBox® and PS2® have an interest in copy protecting the games they have designed and written which may not be shared by the games console manufacturers, for example, Microsoft and Sony. There therefore exists a need to enable protection of the information to be applied to the optical disc, for the protection of the licensed game provider, for example, which does not require the involvement of the games console manufacturer.

The present invention seeks to address this need.

Throughout the specification and claims, the term "DSV data patterns" means data patterns which are likely to be difficult to encode without the encoded data causing DSV problems.

Thus, when "DSV data patterns" are encoded and written to an optical disc, for example, by a writer, a reader or player of encoded data incorporating the DSV data patterns will experience DSV problems.

According to a first aspect of the present invention there is provided an application file to be carried on an optical disc, wherein the application file incorporates information and control data for an application, and wherein, to provide copy protection for the application, DSV data patterns as hereinbefore defined are incorporated in the application file, the DSV data patterns being located in the application file in a manner to ensure that they will be accessed by a player or a reader of an optical disc carrying the application file.

It will be understood that reference to access by a player or reader to an application file includes access to the application file by an operating system is which is arranged to load and run the application file.

The present invention utilises the inherent limitations of currently available CD and DVD writers. Thus, the applicants have found that it is possible to provide DSV data patterns which, because of their size and/or nature, cannot be accurately written onto a disc by a writer for recordable discs such that the disc remains reliably readable. However, the much more sophisticated encoders used in mastering houses, for example, the encoder which controls a laser beam recorder, can be controlled to accurately write the DSV data patterns to the glass master.

The encoder associated with a laser beam recorder has a relatively large amount of memory and processing power at its disposal. Specifically, the encoder uses sophisticated algorithms to analyse the information, including the DSV data patterns, which is to be encoded and written to the disc. The purpose of these algorithms is to ensure that this information is encoded onto the glass master in a manner which ensures that the information on the discs produced using this glass master can be read correctly by all CD and DVD readers. For a CD, the encoder chooses the merge bits which are interspersed in the encoded data as part of the encoding process and the chosen merge bit pattern ensures the readability of the replica discs made from the glass master. Similarly, for a DVD, the encoder chooses the sequence of channel bits to ensure readability. These sophisticated encoders can compromise the readability of one area of disc slightly, to ensure the readability of another area of disc, the overall effect being to ensure that the whole disc has a uniformly high readability.

By contrast, commercially available CD and DVD writers are limited in the processing power and memory which can be brought to bear on the problem of encoding the data. Specifically, the encoder built into a writing device contains simpler encoding algorithms because complicated algorithms require more processing power, more memory and they are more expensive to design, write and debug which reduces the profit margin on the writer. These simpler encoding algorithms may not make the ideal choices for merge bits or the sequence of channel bits even when the better choices are readily available. If one area of disc is easy to encode so as to ensure high readability and the following region is difficult to encode and would have a low readability, the simple encoders in writers do not have the foresight to trade-off the readability of one area with another and the result is that the easily encoded region is encoded well and the region which is difficult to encode is encoded badly and when the disc is read, errors are found in this latter region.

It would, of course, be possible to provide special or customised encoders to apply DSV data patterns to the optical disc. However, the applicants have found that they can add the DSV data patterns without the need for any special equipment. However, the invention comprehends the use of existing, customised and/or special encoders.

The use of the inherent limitations of currently available disc writers, and the provision of DSV problems by way of an applied authenticating signature is described in our earlier application WO 02/11136.

However, the applicants have now discovered that DSV data patterns need not be confined for use as an authenticating signature, and that they can provide DSV data patterns in an application file to be carried on an optical disc, such that these DSV data patterns together with the inherent limitations of optical disc writers provide copy protection for the application carried on the optical disc.

In an embodiment, the DSV data patterns are located in the information incorporated in the application file.

Additionally and/or alternatively, the DSV data patterns are incorporated in locations of the application file which are normally accessed upon use of the application file.

For example, the DSV data patterns may be located in control data incorporated in the application file and/or in control data incorporated in a header of the application file.

The control data in the application file and/or the control data in a header of the application file may include at least one pointer or offset pointing to the location of DSV data patterns in the application file.

Preferably, the DSV data patterns are chosen to cause DSV problems for optical disc writers.

For example, the DSV data patterns may be chosen to ensure that the DSV has a significant absolute value.

In an embodiment, the DSV data patterns are repeated patterns of values.

The size of the DSV data patterns may be a predetermined amount.

It is generally thought that the effectiveness of the DSV data patterns is maximised where the DSV data patterns are arranged to produce a DSV which has a rapid rate of change.

In addition, it is preferred that the DSV data patterns are arranged to produce a DSV which has a substantial low frequency component.

In an embodiment, areas of data containing only zeros are incorporated in the application file before, and/or after, and/or before and after areas containing the DSV data patterns.

As is well known, the information in the application file may comprise one or more of: audio data, numerical data, text data, video data, graphics data, program data, animation data and/or any other data. Similarly, the control data in the application file comprises descriptors of the information and/or data enabling access to the information. For example, the access enabling control data comprises navigation and/or timing data.

It will be appreciated that the application file may be of any appropriate format. As is well known, the format will be chosen to be compatible with the program or operating system by which the application is to be run.

The invention also extends to a copy protected optical disc carrying an application, wherein the application is defined by an application file as defined above, and wherein the application file has been applied to the optical disc.

In an embodiment, the application file has been applied to the optical disc by a mastering process utilising an encoder with 'look-ahead' capabilities.

Alternatively, the application file has been applied to the optical disc by a mastering process utilising an encoder controlling a laser beam recorder.

According to a further aspect of the invention there is provided a method of copy protecting an application, where the application is provided by an application file to be carried on an optical disc and incorporating information and control data, the method comprising incorporating into the application file, before its application onto an optical disc, DSV data patterns as hereinbefore defined.

Preferably, the method further comprises locating the DSV data patterns in the application file in a manner to ensure that they will be accessed by a player or reader of an optical disc carrying the application file.

In an embodiment, the method further comprises locating the DSV data patterns in the information incorporated in the application file.

In a preferred embodiment, the DSV data patterns are incorporated in locations of the application file which are normally accessed upon use of the application file. For example, where the application file has control data and/or a header in which control data is incorporated, the method further comprises locating the DSV data patterns in the control data.

Where the application file has control data and/or a header in which control data is incorporated, the method may alternatively or additionally comprise including at least one pointer or offset in the control data which points to the location of the DSV data patterns in the application file.

Preferably, said DSV data patterns have been chosen to cause DSV problems for optical disc writers.

In an embodiment, the DSV data patterns are chosen to ensure that the DSV has a significant absolute value.

The DSV data patterns may be repeated patterns of values.

The size of the DSV data patterns may be a predetermined amount.

It is preferred that the DSV data patterns are arranged to produce a DSV which has a rapid rate of change. It is currently thought that this is the most effective way to ensure reading problems for copy discs.

Preferably, the DSV data patterns are arranged to produce a DSV which has a substantial low frequency component.

In an embodiment, the method further comprises incorporating into the application file areas containing only zeros before, and/or after, and/or before and after areas containing the DSV data patterns.

The invention also extends to a copy protected optical disc carrying an application, wherein the application is defined by an application file which has been copy protected as defined above, and wherein the application file has been applied to the optical disc.

In an embodiment, the application file has been applied to the optical disc by a mastering process utilising an encoder with "look ahead" capabilities.

Alternatively, the application file has been applied to the optical disc by a mastering process utilising an encoder controlling a laser beam recorder.

The present invention also extends to a storage device for use in a process of mastering optical discs, wherein the storage device carries an application file to be carried on the optical discs, the application file incorporating information and control data for an application, and wherein DSV data patterns as hereinbefore defined are incorporated in the application file.

In an embodiment, the DSV data patterns are located in the application file in a manner to ensure that they will be accessed by a player or a reader of an optical disc carrying the application file.

A storage device as defined may be used, for example, by a licensed games supplier, to supply a games application to a games console manufacturer.

Preferably, the DSV data patterns are chosen to cause DSV problems for optical disc writers.

In an embodiment, the DSV data patterns are chosen to ensure that the DSV has a significant absolute value.

The DSV data patterns may be repeated patterns of values.

The size of the DSV data patterns may be a predetermined amount.

It is presently preferred that the DSV data patterns are arranged to produce a DSV which has a substantial low frequency component.

The storage device may be, for example, a master tape or other recordable medium on which the application file incorporating the DSV data patterns is recorded. The storage device may also be provided by electronic memory, for example, in a computer. In this embodiment, the application file may be provided as a set of image files representing the data to be mastered.

Alternatively, the storage device may be an optical disc onto which the application file is recorded. This recording may be by way of encoding in a manner to ensure that the DSV data patterns do not cause DSV problems. It is alternatively possible to record the application file onto a storage device such as an optical disc with the DSV data patterns in an encrypted form.

Embodiments of the present invention will hereinafter be described, by way of example, with reference to the accompanying drawings, in which.

Figure 1:
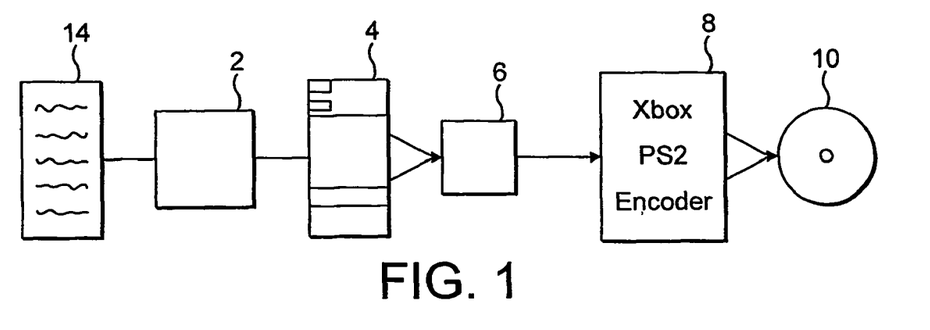
FIG. 1 illustrates graphically the production of optical discs for use in games consoles.

FIG. 1 illustrates the production of optical discs, generally DVDs, for use in games consoles such as the XBox® produced by Microsoft or the PS2® produced by Sony. In this respect, licensed games providers will design a game and write the software for it. They then use a toolkit, indicated at 2, provided by the games console manufacturer, to enable them to present the software 14 in appropriate application files which can be run by the proprietary games consoles. With the use of the toolkit 2, the application file 4 can be provided as a set of image files 6 representing the data to be mastered. The image files 6 may be in disc description protocol file format and may be recorded on an appropriate storage device, such as a mastering tape or on other recordable media. The image files 6 are then provided to the games console manufacturer who, after making appropriate tests, will encode the application file 4 onto a glass master 10 by way of an encoder 8.

The suppliers of the content of the application file, in this case the licensed games providers, are often concerned to ensure that the content they have produced is copy protected. Unfortunately, companies such as Microsoft and Sony have been reluctant to employ known techniques for copy protection in the encoding undertaken by the encoder 8. The present invention solves this problem as it does not require that action be taken at the time of encoding by the encoder 8. Furthermore, the techniques do not require access to or assistance from the software writers. As is made clear below, DSV data patterns indicated at 12 can be added to the application file 4 before it is presented to the games console manufacturer. These DSV data patterns will generally cause no problem for an encoder such as 8 of the games console manufacturer, but will provide copy protection for the resultant DVDs produced from the glass master 10.

The copy protection technique relies upon the use of DSV data patterns as described, for example, in WO 02/11136. A brief description explaining DSV and how it is utilised now follows. This description begins specifically by reference to the encoding of a CD-ROM. However, it will be appreciated that the present invention is not limited to use with a CD-ROM and finds application to all data carrying optical discs. Specifically, the invention is applicable to all formats of CDs and to all formats of DVDs.

Figure 2:
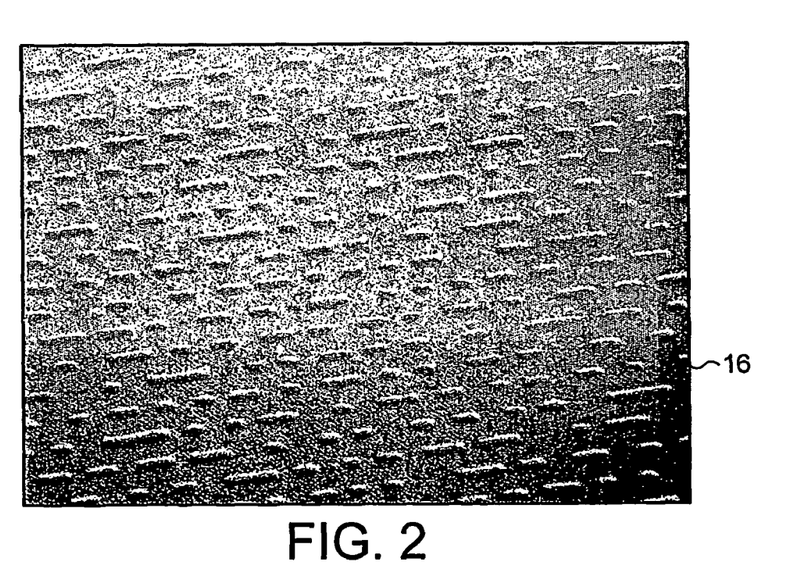
FIG. 2 shows the surface of a compact disc, very much enlarged, showing the pits thereon.

FIG. 2 shows an enlarged view of part of a CD showing the pits 16 thereon. As is well known, these pits extend along a spiral track on the surface of the disc and are separated by lands.

Figure 3:
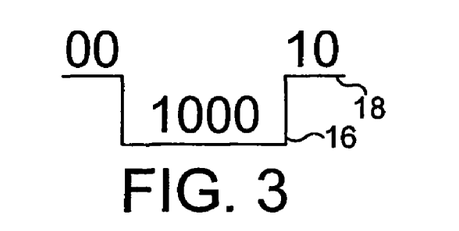
FIG. 3 shows a cross section of a pit illustrating the data associated therewith.

FIG. 3 shows a section through a pit 16 and land 18 illustrating how data is encoded on a CD. The pits and lands do not represent binary 0s and 1s, but instead represent transitions from one state to another. The data signal is stored in NRZI form (Non-Return to Zero inverted), where the signal is inverted every time a 1 is encountered. FIG. 3 shows the binary value 00100010.

The data stream always consists of pits and lands of at least 3 bits and at most 11 bits long. This is sometimes referred to as a 3T-11T where T is a 1 bit period. A 3T pit has the highest signal frequency (720 khz) and an 11T pit has the lowest signal frequency (196 khz).

A data signal is derived from the lengths of the pits and lands. The produced signal forms a square wave known as an EFM signal. The digital sum value (DSV) is the running difference between the number of T values where the EFM represents a pit and the number of T values where the EFM represents a land. As each data bit is read, the DSV is incremented or decremented depending upon whether the data bit corresponds to a pit or a land.

Figure 4:
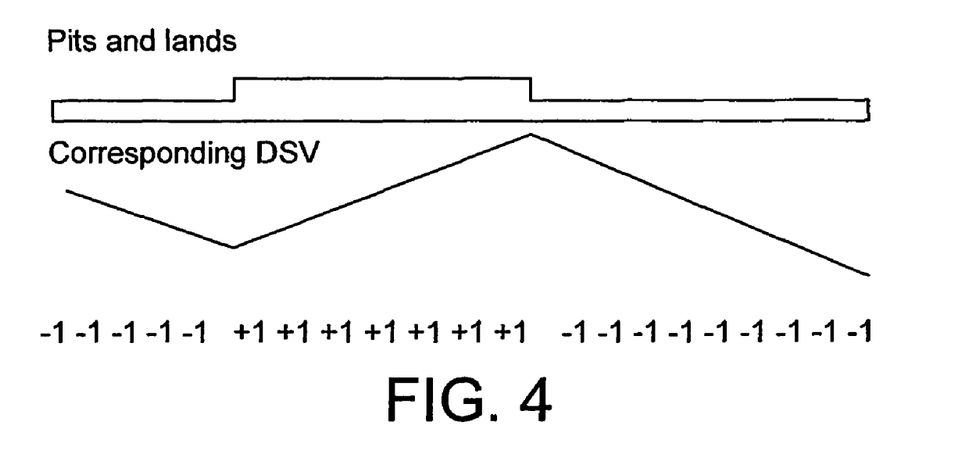
FIG. 4 shows the DSV associated with pits and lands of a compact disc.

FIG. 4 shows the DSV associated with pits and lands on a disc. As is indicated in FIG. 4, the DSV is determined by assigning the value +1 to each land T, and −1 to each pit T. Ideally, the DSV should stray as little as possible from the zero level. If the DSV has a rapid rate of change over a significant period of time or if the DSV has substantial low frequency components then the transitions in the EFM signal may be shifted from their ideal values and/or the ability of tracking and focus circuits in CD drives to maintain optimal head positioning may be compromised. This typically causes read failures from the CD.

Original data, in 8 bit bytes, is passed through a process called EFM encoding to produce the 14 bit symbols, often referred to as channel bits. The set of 14 bit symbols is especially designed:

to level out the number of pits and lands, to help maintain balanced DSV; and to ensure that there are no symbols which break the EFM coding scheme of 3T-11T.

Another way of regarding the 3T-11T coding scheme is that the number of successive zeros must be greater than or equal to two and less than or equal to ten. It is immediately apparent that this requirement may be compromised where two 14 bit symbols follow one after the other. Accordingly, a set of 3 merge bits are added between each 14 bit symbol and the one following to ensure that there are no violations of the 3T-11T coding scheme and to ensure that a suitable DSV is maintained.

The merge bits contain no useful data and the algorithm used to generate their values can differ from drive to drive. Once read, the merge bits are discarded and the data contained in the 14 bit symbol is passed onto the next process.

The above describes the basic encoding scheme for a CD and will be known to those skilled in the art. Accordingly, further explanation thereof is not required.

As set out above, embodiments of this invention utilise the inherent limitations of currently available CD writers, and in particular the differences in capability between the encoder associated with a laser beam recorder and that in a CD writer.

The encoding of a CD is subject to two rigorous conditions and one more vague requirement. The first strict rule is that the encoded data must decode without errors into the data which the software writer wanted on the disc. The second strict rule is that the encoding must obey the run-length limiting rules so that no pits or lands are longer than 11T or shorter than 3T. The vague requirement is that the DSV characteristics of the disc should be as good as possible.

As set out above, DSV is a property of the encoded data. It is a running difference between the number of pit T states and the number of land T states. It is desirable that the DSV should not have high absolute values, should not change rapidly, and should not have low frequency components. This latter requirement means that the DSV should not oscillate in a regular fashion.

In order to maintain good DSV characteristics, the encoder often has a choice in the merge bits to insert between the symbols which carry the data. When encoding certain special patterns of data, the encoder has a very much reduced ability to choose merge bits because the run-length limiting rules place limitations on the merge bits which can precede or follow certain symbols. The encoder effectively loses much of its control of the DSV while this data is being encoded. It is critical that it chooses correctly in the few locations where it has a choice.

A sophisticated encoder, such as those which control laser beam recorders, may have the foresight, or can be designed, to choose a pattern of merge bits which is not optimal for the immediate locality where this area is followed by one in which the run length limiting rules dictate the merge bits. The result will be that the overall DSV for the two areas will have better properties. The ability to detect upcoming areas where the merge bit choices are limited is called "look-ahead". Encoders with a larger look-ahead will be able to make more preparations for encoding the troublesome data and hence the overall encoding will be better. CD writers typically have very little ability to look ahead and hence when they lose control of the DSV, it is more likely to result in an unreadable disc.

The applicants have identified a number of symbol values which are capable of causing DSV problems because of their EFM pattern at the pits and lands level. When the patterns for these values are processed through the EFM decoder of a CD drive, the DSV accumulates or decrements and this can result in read failures. Of course, and as indicated above, the encoding process for a CD is designed to prevent values capable of causing DSV problems occurring in the EFM pattern as well as providing robust error correction.

As will be well known, DVDs are subject to encoding known as EFMPlus. In this scheme the 8 bit data words are encoded into 16 bit channel bits and state machines are used to choose the 16 bit symbols. As this choice can be made so that the coding scheme is not compromised, a flexibility given by the increased number of bits in each symbol, merge bits are not required.

On decoding, the information that was present in the 8 bit data words is recreated but the encoding scheme is lost.

As set out above, this invention proposes that DSV data patterns, that is, data patterns which are difficult to encode without causing DSV problems, are to be incorporated into the application file 4. It is expected that the sophisticated encoder 8 at the games console manufacturer, for example, such as Sony or Microsoft will be able, for example by using look-ahead techniques, to encode and apply the application to the glass master 10 in a manner such that the encoded data will not cause DSV problems. Therefore, the DVDs made from the glass master and supplied to customers will be usable readily and without problems. However, if an attempt is made to read the data on the original disc, for example for copying purposes, the DSV data patterns will cause a CD or DVD writer to encode the data on the copy disc in a manner to render the resultant copy disc effectively unplayable.

Figure 5:
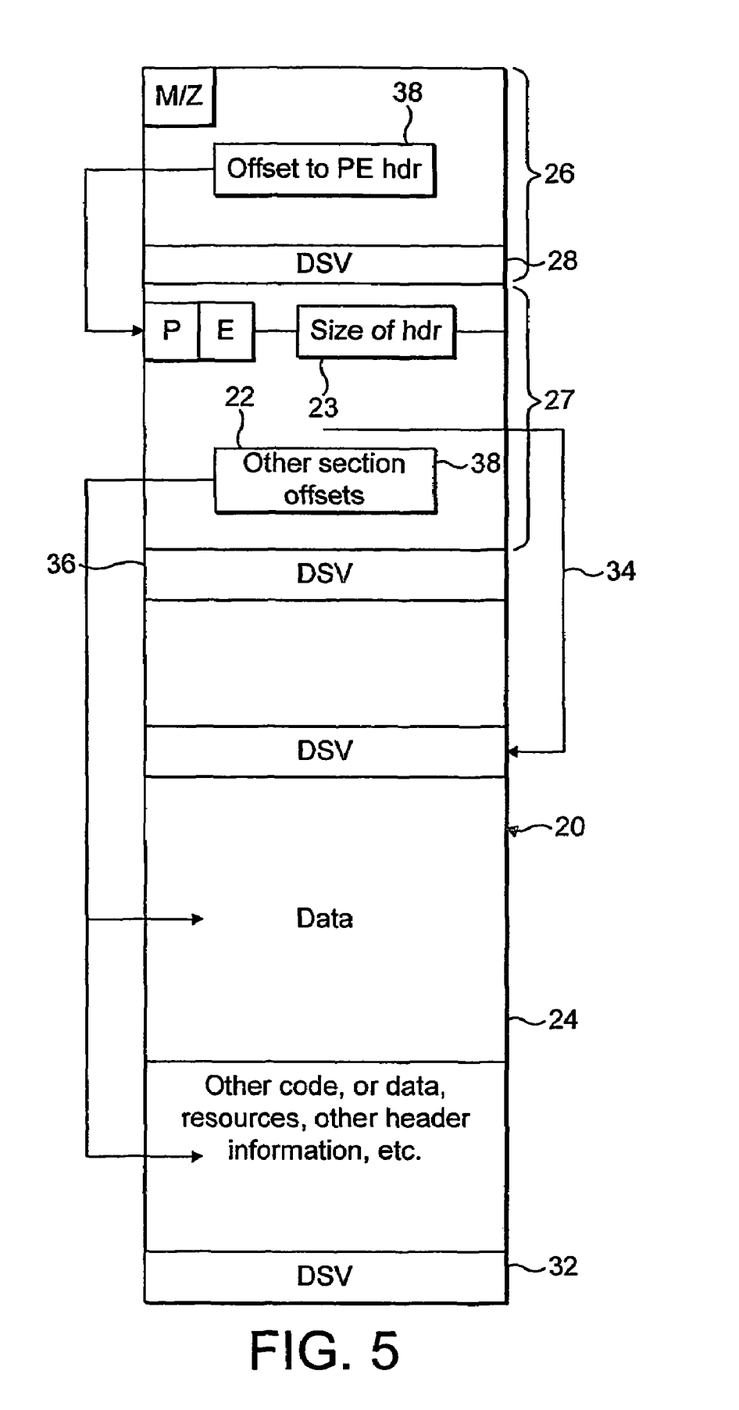
FIG. 5 shows schematically an application file having DSV data patterns incorporated therein.

FIG. 5 shows schematically an application file 20. In this respect, it will be appreciated that all applications have a format determined by the program or operating system concerned and that this format will include control data indicated at 22 and information indicated at 24. FIG. 5 shows an application file in portable executable file format ("PE") for use by the DOS/Windows operating system. The application file 20 has a DOS header 26 and a PE header 27. These headers 26, 27 include descriptors indicating the contents of the file and the location of the information. It is the header 26 which will generally be accessed first when the application is to be accessed.

In this respect, it will be appreciated that the file format shown in FIG. 5 is by way of example and that this invention is applicable to any type of file format for use with any operating system. Most application files will have some sort of lead-in or header including descriptors indicating the contents of the file and the location of the information.

In the specific example shown in FIG. 5 DSV patterns 28 have been incorporated in available space in the DOS header 26. However, if such space were not available, large gaps could be made in the header 26 without any effect and DSV patterns as 28 then put into those gaps.

As set out above, the DSV data patterns, as 28, are chosen so that sophisticated encoders as used, by example, by the games console manufacturers, will be able to encode them in a manner which does not give the resultant original discs DSV problems. However, the writers available to consumers will not have the capability to handle the DSV data patterns capably and a resultant copy disc made by such a writer will be difficult, if not impossible, to play. Thus, if a copy disc is used in a games console to play the application on it, the operating system or the player will encounter DSV problems as it tries to load the header 26 preparatory to running the application. It is expected, for example, that in this circumstance, the game simply will not load.

It is, of course, possible to place the DSV data patterns in alternative or additional areas of the application file as indicated at 32. In this respect, the location might be changed to confuse hackers and pirates, or to better integrate the DSV data patterns with the data of the application file so that it cannot easily be stripped out. If, for example, the DSV data patterns are simply incorporated within the information data then it is probable that the game will load, but then it is likely that the game will not be able to be completed because problems will occur when the application requires that the information in which the DSV data patterns are incorporated is utilised.

Additionally and/or alternatively, the DSV data patterns may be provided amongst the information but with pointers as 34 thereto in the header 27 and/or in other control or navigation data.

DSV data patterns 36 are also shown located immediately after the PE header 27. In this respect, the information about the size of the header, set out in control data 23, has been changed to include the data patterns 36. This ensures that the DSV data patterns 36 are read.

FIG. 5 also illustrates the provision of offsets 38 to cause access to specific locations of the application file 20. The offsets 38 and/or any pointers to specific locations may be changed either to point directly to DSV data patterns or to reliably point to locations which have DSV data patterns but whose location has been moved to accommodate the DSV data patterns.

When locating the DSV data patterns within the application file 20 it is necessary only to ensure that the operating system of the game console will wish to use that data at some time. This means, of course, that the game is likely to stop running when the DSV data patterns come to be read.

It would be possible to incorporate within the application file pre and post padding areas, for example, containing zeros, around the DSV data patterns. These may be helpful to the encoder used in the mastering process in providing time which the encoder can use to make an optimum choice of merge bits or of the 16 bit channel bits.

Additionally and/or alternatively, other data having a stabilising effect, that is data which clearly does not cause DSV problems may be provided around the DSV data patterns.

An example of DSV data patterns which might be used with the present invention is set out in WO 02/11136.

Figure 6:
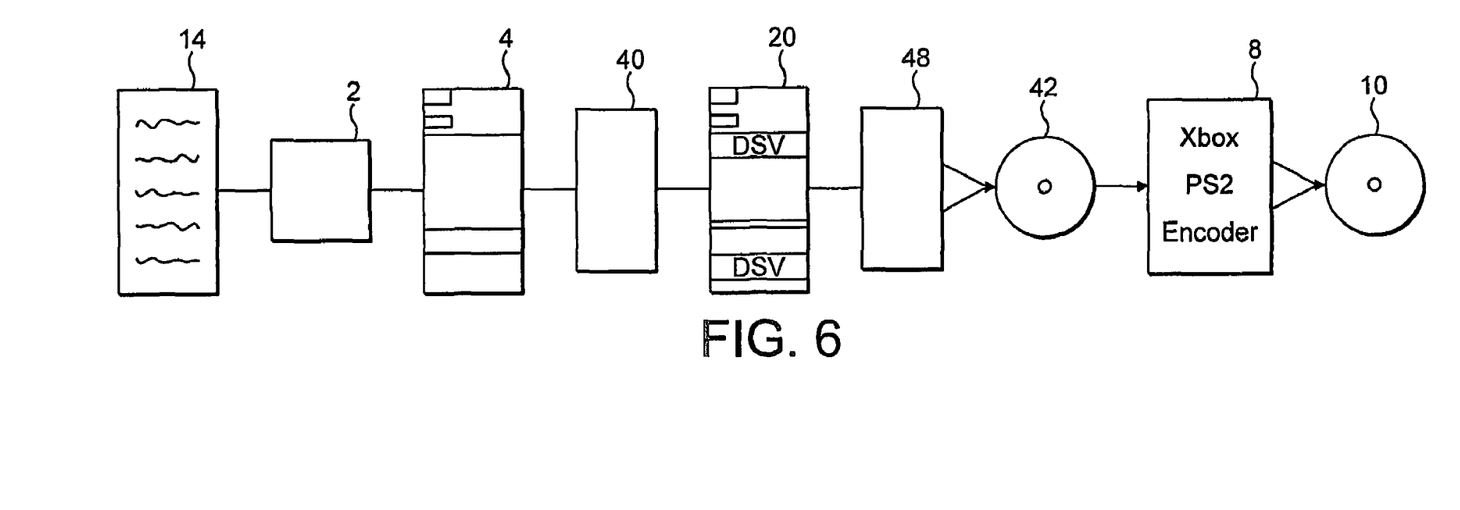
FIG. 6 illustrates graphically the production of optical discs for use in games consoles in accordance with the present invention.

FIG. 6 illustrates the production of optical discs, for example, DVDs for use in games consoles using an application file of the present invention. As previously, the software 14 provided by a games provider will be formed into an application file 4 using the toolkit 2. The application file 4 is then converted into an application file 20 having incorporated DSV data patterns using a toolkit 40 provided by the applicants. The formation of the application file 20 may be undertaken, for example, by a publisher.

The application file 20 then has to be made available to the mastering house for encoding by the master encoder 8 onto a glass master 10. This may be done, as described above, by providing the application file 20 as a set of image files 6 and recording the data onto tape or other recordable media or storing the information in electronic memory.

Alternatively, and as indicated in FIG. 6, the publisher may make one or more recordable discs 42 by way of a special encoder 48. This special encoder 48 is enabled to encode the application file in a manner which will not cause DSV problems. The resultant recordable discs 42 can then be decoded and encoded at the mastering house to form the glass master.

It would also be possible to enable the publisher to write the application file 20 to a gold disc 42 with the DSV data patterns in an encrypted form so that they can be written by a standard writer, for example, without any 'look ahead' facilities. In this embodiment, the encoder 8 at the mastering house has to be enabled to decrypt the DSV patterns such that they are incorporated into the application file 20 before it is encoded and written to the glass master.

It has been set out above that this invention relies upon the ability of the encoder used in the mastering process to encode the application file together with the incorporated DSV data patterns in a manner which will not cause DSV problems for the resultant optical discs. Of course, and if required, the mastering house can be provided with specially designed encoders which have been arranged to cope with the DSV data patterns which are provided.

The invention has been described above with reference to the provision of DVDs carrying games for use in proprietary games consoles. It will, of course, be appreciated that the invention is not limited to the nature of the information content of the application on the optical disc. For example, in our copending application (Ref. P9483 GB), filed on the same day as this case, we describe and claim the incorporation of DSV data patterns into files, for example, MPEG files, encoding video and audio. The DSV data patterns are incorporated into the MPEG and other files to copy protect the data therein for transmission. However, such files may comprise application files as described herein and be encoded onto DVDs to copy protect the discs. This is of particular relevance to the DVD rental industry who are thereby provided with copy protected DVDs. As described above, a special encoder may be required in order to encode the MPEG and other files, which incorporate the DSV data patterns, onto the DVD.

Furthermore, the invention is not limited to the use of games consoles as the disc player or reader. Clearly the invention has applicability to the copy protection of all types of applications to be encoded onto an optical disc for use in any appropriate type of reader or player.

It will be appreciated that variations in and modifications to the embodiments as described and illustrated may be made within the scope of this application.

The invention claimed is:

1. A method of copy protecting an application, where the application is provided by an application file which is to be carried on an optical disc, the application incorporating information and control data, the method comprising:
    incorporating into the application file DSV data patterns which have been identified as capable of causing DSV problems when encoded onto an optical disc and wherein the DSV patterns are chosen to ensure that the DSV has a significant absolute value or the DSV data patterns are repeated patterns of values; wherein the DSV data patterns are incorporated immediately following at least two headers in the control data in the application file to ensure the DSV data patterns are accessed by a player or reader of the optical disc during use of the application file and wherein for each header information about the size of the header in the control data is modified to include information on the size of at least one of the DSV data patterns and at least one pointer or offset in the control data which points to the location of the DSV data patterns in the application file to ensure that the DSV data patterns are read.

2. A method according to claim 1, wherein the information in the application file comprises one or more of: audio data, numerical data, text data, video data, graphics data, program data, animation data and any other data.

3. A method according to claim 1, wherein the control data in the application file comprises one or more of: descriptors of the information and data enabling access to the information.

4. A method according to claim 3, wherein the control data comprises navigation and/or timing data.

5. A method of copy protecting an application according to claim 1, wherein the size of the DSV data patterns is a predetermined amount.

6. A method of copy protecting an application according to claim 1, wherein the DSV data patterns are arranged to produce a DSV which has a rapid rate of change.

7. A method of copy protecting an application according to claim 1, wherein the DSV data patterns are arranged to produce a DSV which has a substantial low frequency component.

8. A method of copy protecting an application according to claim 1, further comprising incorporating into the application file areas containing only zeros, the areas containing only zeros being incorporated in one or more areas located before and after areas containing the DSV data patterns.

9. A method according to claim 1, further comprising:
    encoding the application file with the DSV data patterns on the optical disc.

10. A method according to claim 1, further comprising:
    recording the application file with the DSV data patterns onto a recordable medium.

11. An optical disc carrying the copy protected application of claim 1.

12. A recordable storage medium carrying the copy protected application of claim 1.

* * * * *

UNITED STATES PATENT AND TRADEMARK OFFICE
CERTIFICATE OF CORRECTION

PATENT NO.      : 7,661,145 B2
APPLICATION NO. : 10/504812
DATED           : February 9, 2010
INVENTOR(S)     : Heylen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1156 days.

Signed and Sealed this

Thirtieth Day of November, 2010

David J. Kappos
*Director of the United States Patent and Trademark Office*